A. C. MOORE & J. F. COONAN.
LIVE STOCK COUNTER.
APPLICATION FILED JAN. 26, 1917.

1,250,483.

Patented Dec. 18, 1917.
2 SHEETS—SHEET 1.

WITNESS
John B. Dade.

INVENTORS
Austin C. Moore and John F. Coonan.

BY
Wilkinson, Giusta & Maclean
Their ATTORNEYS

A. C. MOORE & J. F. COONAN.
LIVE STOCK COUNTER.
APPLICATION FILED JAN. 26, 1917.
1,250,483.
Patented Dec. 18, 1917.
2 SHEETS—SHEET 2.
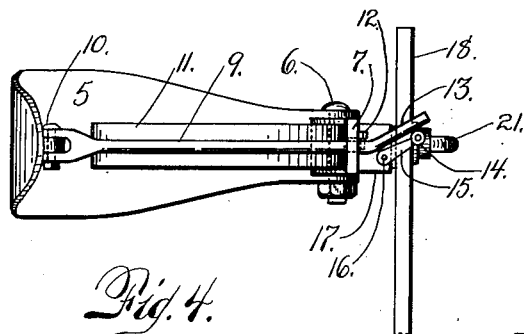
Fig. 4.
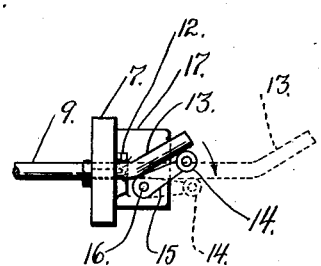
Fig. 5.
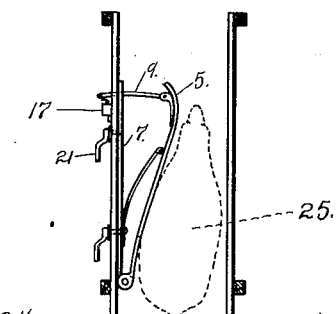
Fig. 6.
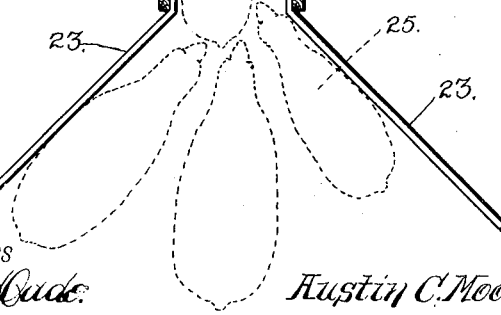
WITNESS
John B. Dade.
INVENTORS
Austin C. Moore & John F. Coonan.
BY
Wilkinson, Ginsta + Mackaye
Their ATTORNEYS.

UNITED STATES PATENT OFFICE.

AUSTIN C. MOORE AND JOHN F. COONAN, OF BOISE, IDAHO.

LIVE-STOCK COUNTER.

1,250,483.  Specification of Letters Patent.  Patented Dec. 18, 1917.

Application filed January 26, 1917. Serial No. 144,760.

*To all whom it may concern:*

Be it known that we, AUSTIN C. MOORE and JOHN F. COONAN, both citizens of the United States, residing at Boise, in the county of Ada and State of Idaho, have invented certain new and useful Improvements in Live-Stock Counters; and we do hereby declare the following to be a full, clear, and exact description of the invention, such as will enable others skilled in the art to which it appertains to make and use the same.

This invention relates to improvements in apparatus for mechanically counting and automatically registering the count of live-stock by the moving animals themselves.

It will be obvious that the use of the invention is not limited to any particular class of live-stock, but, for the purpose of simplicity of description in the following specification, we will only refer to sheep.

In counting sheep on the range or in the stock yards, it is customary to herd them in a corral or like inclosure, from whence they are driven through an outlet chute or passage, of restricted width to permit only one animal to pass through at a time or in single file, the sheep being counted individually as they pass through and out.

Normally, therefore, it would naturally require the time of an agent of the buyer as well as of the seller to do the actual counting, and obviously accidental or even fraudulent miscounts result over which objectionable disputes and delays arise.

The primary object of this invention is to overcome these disagreeable features by providing a reliable apparatus which will not only efficiently and automatically register the exact count but which also facilitates the counting and at a much less expense, requiring the active attention of but one man—the driver of the sheep—when the apparatus is properly set up in the corral chute.

Other objects and advantages of our improvements will appear from the following description, the particular features of novelty being more succinctly stated in the appended claim.

Referring to the accompanying drawings, forming a part of this application, like characters designate the same parts in the several views, of which—

Figure 1:
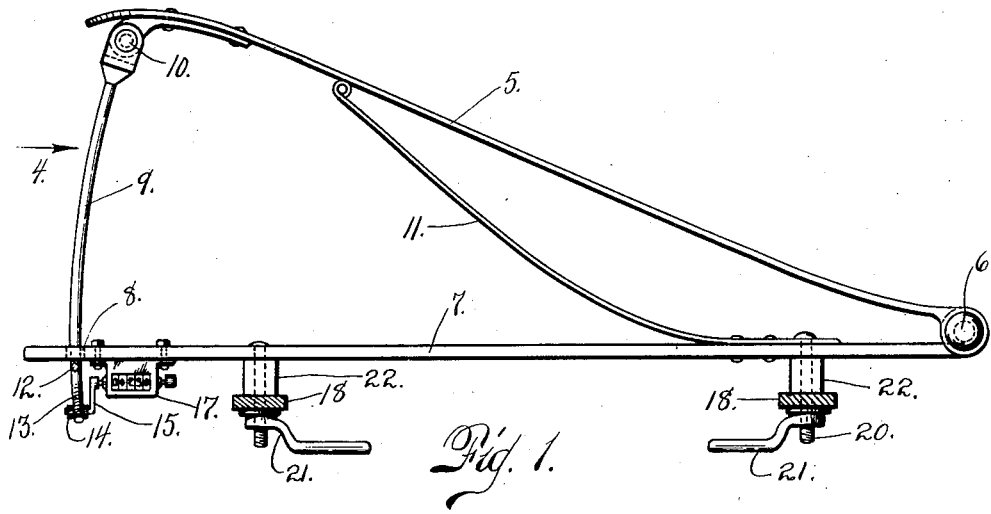
Figure 1, is a plan view of our improved portable apparatus in its normal unregistering position, the securing stakes being shown in cross-section.

Fig. 4, is a view in end elevation looking in the direction of the arrow 4 in Fig. 1, Fig. 5, is a detail view looking at the right hand end of Fig. 4, showing in full lines the position of the actuating rod and register lever arm as associated in non-registering position, and in dotted lines showing their relative positions when actuated to operate the register, and Fig. 6, is a plan view illustrating the application of our invention to a corral chute, and also showing how the apparatus may be detachably secured directly to the wall of a corral chute instead of to securing stakes as illustrated in the other views, the dotted figures designating the sheep being counted.

The apparatus is portable as a whole and of light but strong metallic construction.

In general arrangement, it is substantially in the form of an open triangular framework, comprising a rear supporting bar, a forward operating presser plate, hinged to said supporting bar at one end, and at its other end pivotally connected to a transversely-extending actuating rod operatively engaging the lever arm of a suitable registering mechanism mounted on the outer end of the supporting bar.

5 designates the operating presser plate, preferably of a suitable flat curving contour, broadening out toward its outer end to present a smooth surface contacting the side of the sheep passing through the outlet chute as hereinafter mentioned.

The inner end of the presser plate 5 is hinged or suitably pivoted, as at 6, to the inner end of the elongated rear supporting bar 7, which latter may be apertured at its other end, as at 8, to permit of the free passage therethrough of the outer end of the actuating rod 9, suitably pivoted at its inner end, as at 10, to the outer end of the presser plate 5.

11 is a spring element interposed between the supporting bar 7 and presser plate 5. It is shown as a flat spring, not too highly tensioned, secured at one end to the supporting bar and at its free end slidingly engaging the presser plate to normally maintain the latter in its distended position.

12 is a stop element or set screw for the actuating rod 9 to limit the return movement of the rod and thus also the presser plate 5 when actuated to operate the register, the set screw being adapted to engage the outer face of the supporting bar as an abutment, as clearly shown in Figs. 1, 4 and 5.

The outer end of the actuating rod 9 extends upwardly and outwardly, as at 13, at an obtuse angle, and rides as an inclined plane upon the lateral roller extension 14 of the lever arm 15 of the operating shaft 16 of a suitable type of registering device 17, conventionally shown as a well known Veeder register, suitably secured as by bolts or rivets to the supporting bar 9.

18 designates stakes, preferably of metal, having a series of vertically arranged apertures 19, and to these stakes the rear supporting bar 7 of the device may be adjustably supported, at any desired height, by means of securing bolts 20, passing through apertures in the supporting bar and the appropriate apertures 19 in the stakes, the ends of the bolts being threaded to receive the base ends of clamping levers 21 for binding the parts rigidly together.

Suitable spacing elements 22 may be employed, if desired, shown as between the stakes and the supporting bar of the device.

In Fig. 6, 23 designates the walls of the corral and 24 the walls of the outlet chute or passage, while the dotted figures, indicated at 25, represent sheep passing from the corral, in single file.

In this latter figure, which diagrammatically illustrates the application of the invention, our improved appliance is shown as being directly applied to one wall of the chute itself, instead of to the stakes 18, as shown in the other figures, but where the stakes are employed, and they are preferably used, it will be obvious that they may be driven into the ground, inside the chute, adjacent one wall thereof.

In operation, the device being applied to a wall of the chute, or to the stakes in the same relative position, and with the apex of the triangular structure disposed toward the corral and the base, or actuating rod, toward the outlet of the chute, it will be seen that a more or less restricted neck opening will be left, between the presser plate and the other side of the chute, through which the sheep will have to pass.

Figure 2:
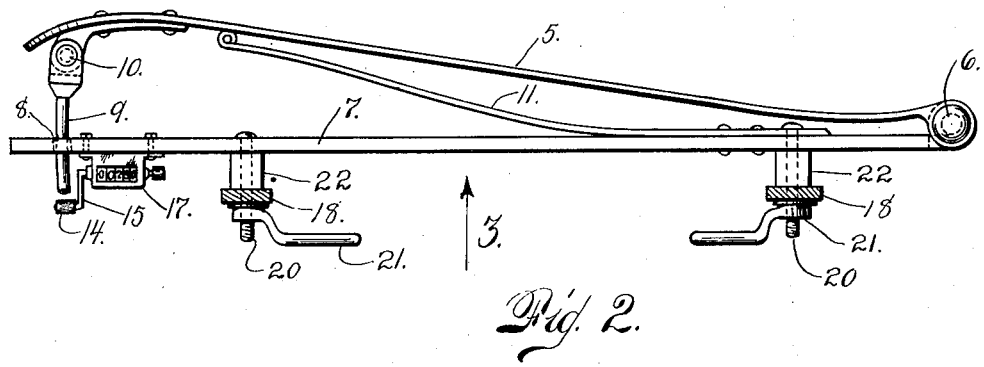
Fig. 2, is a view similar to Fig. 1, but with the parts moved to a position, by a passing sheep, to actuate the register, and the register actuating rod being shown broken off to conserve space on the drawings.
Figure 3:
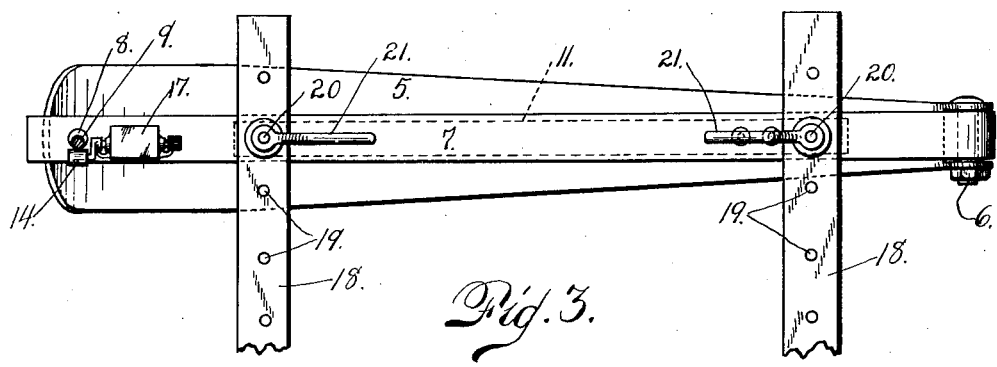
Fig. 3, is a view in side elevation looking in the direction of the arrow 3 in Fig. 2, with the register actuating rod and the securing stakes broken off.

As each sheep passes through this space it forces the presser plate 5 back against the pressure of the spring element 11, thus moving the actuating rod 9 inwardly, as seen at Fig. 2.

The end 13 of the actuating rod bearing and riding, during this movement, as an inclined plane on the roller extension 14 of the register lever arm 15, has the action of a wedge element forcing the lever arm 15 downwardly, from the position shown in full lines in Figs. 4 and 5 to the position shown in dotted lines in Fig. 5, where registering is effected, whereupon the operating shaft 16 of the register 17 will have actuated the register one point.

Should an unusually fat sheep pass through, it will be obvious, from the dotted lines of Fig. 5, that it will not in any way affect the register further, as the inclined end of the actuating rod will simply be projected beyond the roller 14, while the rod proper rests and rides thereon, and the register lever arm 15 will not be returned to its normal set position until that particular sheep registered has passed by the appliance.

Thus as each sheep passes through it is automatically registered up, and the next following sheep will not affect the register until the preceding one has been counted, owing to the triangular arrangement of the structure, presenting a much larger passageway at the vertex end of the same than at its base end. We are aware that apparatus for the mechanical counting of live-stock has heretofore been devised, operated with partial effectiveness, and we make no claim to the broad idea as such, our invention residing in the novel arrangement and combination of elements affording a truly practical appliance of this character, which is of simple construction and operation, can be manufactured and sold at comparatively small cost, and being of a portable nature may be carried from one corral to another and readily applied and adjusted to suit conditions.

However, while our invention resides in the particular novel arrangement and combination of parts as stated, it will be understood that we do not limit ourselves to the exact details as disclosed, excepting as come within the purview of the ensuing claim and a reasonable construction of the scope thereof contemplating a fair range of equivalents.

What we do claim as new and patentable, is:—

In combination with an inclosure having a chute opening, of a portable appliance of the character set forth, comprising an open triangular frame structure, consisting of a rear supporting bar, a forward spring controlled presser plate pivoted at one end to said supporting bar and at its other end diverging therefrom, a registering device carried by said supporting bar and provided with a lever arm having a transverse extension, an actuating rod pivoted at its inner end to the diverging end of said presser plate and at its outer end terminating in an inclined projection adapted to ride on said transverse extension of said lever arm, securing stakes, and means for adjustably clamping said supporting bar to said securing stakes, said stakes being adapted to be driven in the ground within said chute adjacent one wall thereof with said presser plate extending at an acute angle toward the other wall thereof and forming a resilient barrier providing a restricted passageway through said chute, substantially as described.

In testimony whereof, we affix our signatures.

AUSTIN C. MOORE.
JOHN F. COONAN.